[12] United States Patent
Ueno et al.

(10) Patent No.: US 10,717,163 B2
(45) Date of Patent: Jul. 21, 2020

(54) CONTROL METHOD FOR MACHINE TOOL, AND MACHINE TOOL

(71) Applicant: MAKINO MILLING MACHINE CO., LTD., Tokyo (JP)

(72) Inventors: Shunsuke Ueno, Aiko-gun (JP); Takeshi Kawada, Aiko-gun (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 122 days.

(21) Appl. No.: 16/070,727

(22) PCT Filed: Jan. 18, 2016

(86) PCT No.: PCT/JP2016/051305
§ 371 (c)(1),
(2) Date: Jul. 17, 2018

(87) PCT Pub. No.: WO2017/126010
PCT Pub. Date: Jul. 27, 2017

(65) Prior Publication Data
US 2019/0022812 A1  Jan. 24, 2019

(51) Int. Cl.
B23Q 3/157 (2006.01)
B23Q 11/08 (2006.01)
(Continued)

(52) U.S. Cl.
CPC ............ *B23Q 11/1023* (2013.01); *B23Q 3/12* (2013.01); *B23Q 3/155* (2013.01); *B23Q 3/157* (2013.01);
(Continued)

(58) Field of Classification Search
CPC ............... Y10T 483/136; Y10T 483/11; Y10T 409/304032; Y10T 408/44–46;
(Continued)

(56) References Cited

U.S. PATENT DOCUMENTS 4,442,576 A    4/1984  Kitamura
5,079,828 A *  1/1992  Kubo ................ B25J 15/08
                                                483/13
(Continued)

FOREIGN PATENT DOCUMENTS

DE   202005011735   11/2005
JP   S57-156146     9/1982
(Continued)

OTHER PUBLICATIONS

Machine Translation JP 04-358602, which JP '602 was published Dec. 1992.*

(Continued)

Primary Examiner — Erica E Cadugan
(74) Attorney, Agent, or Firm — Morrison & Foerster LLP

(57) ABSTRACT

This method, for controlling a machine tool using a tool holder to which a coolant pipe is attached, includes: a step of detecting, in response to a signal indicating that a tool is prepared on a tool loading station of the machine tool, whether or not an abnormality has occurred in attaching the coolant pipe to the tool holder of the tool while the tool holder is at the tool loading station; and a step of issuing an alarm when the abnormality is detected in the step of detecting the occurrence of the abnormality.

5 Claims, 8 Drawing Sheets

(51) Int. Cl.
  *B23Q 11/10* (2006.01)
  *B23Q 17/00* (2006.01)
  *B23B 31/00* (2006.01)
  *B23Q 3/155* (2006.01)
  *B23Q 11/00* (2006.01)
  *B23Q 3/12* (2006.01)
  *B23Q 15/20* (2006.01)

(52) U.S. Cl.
  CPC ...... *B23Q 3/15536* (2016.11); *B23Q 3/15539* (2016.11); *B23Q 3/15546* (2013.01); *B23Q 11/0085* (2013.01); *B23Q 11/0089* (2013.01); *B23Q 11/08* (2013.01); *B23Q 11/1015* (2013.01); *B23Q 15/20* (2013.01); *B23Q 17/00* (2013.01); *B23B 31/00* (2013.01); *B23Q 2717/006* (2013.01); *Y10T 409/304032* (2015.01); *Y10T 483/11* (2015.01); *Y10T 483/115* (2015.01); *Y10T 483/136* (2015.01); *Y10T 483/14* (2015.01); *Y10T 483/1855* (2015.01)

(58) Field of Classification Search
  CPC .............................. B23Q 3/155–15793; B23Q 11/0078–11/0089; B23Q 11/1015; B23Q 11/1023
  USPC ........................ 483/10, 2; 700/179; 409/136; 408/56–61
  See application file for complete search history.

(56) References Cited

U.S. PATENT DOCUMENTS

| | | | | |
|---|---|---|---|---|
| 5,535,496 A | * | 7/1996 | Sugino | B23Q 39/02 29/39 |
| 6,126,526 A | * | 10/2000 | Herrscher | B24B 25/00 451/259 |
| 7,033,308 B2 | * | 4/2006 | Fujimoto | B23Q 3/15706 15/415.1 |
| 7,462,143 B2 | * | 12/2008 | Hackman | B23Q 1/0018 408/128 |
| 7,727,132 B2 | * | 6/2010 | Bahr | B23Q 3/157 408/56 |

FOREIGN PATENT DOCUMENTS

| | | | | |
|---|---|---|---|---|
| JP | 59-166437 A | * | 9/1984 | |
| JP | 01-216744 A | * | 8/1989 | |
| JP | 04-358602 A | * | 12/1992 | |
| JP | 2000-343367 A | * | 12/2000 | |
| JP | 2005-230956 | | 9/2005 | |
| SU | 1366374 A1 | * | 1/1988 | |

OTHER PUBLICATIONS

Extended European Search Report dated Jun. 17, 2019, directed to European Patent Application No. 16886253.0; 7 pages.

* cited by examiner

CONTROL METHOD FOR MACHINE TOOL, AND MACHINE TOOL

CROSS REFERENCE TO RELATED APPLICATION

This application is a U.S. National phase patent application of International Patent Application No. PCT/JP2016/051305, filed Jan. 18, 2016, the contents of which are hereby incorporated by reference in the present disclosure in its entirety.

FIELD OF THE INVENTION

The present invention relates to a machine tool using a through-spindle coolant supply system.

BACKGROUND OF THE INVENTION

Known in the art is a so-called "through-spindle coolant supply system" which is comprised of a coolant channel running axially through a spindle of a machining center or other machine tool and a tool holder and tool attached to the same and discharges coolant from the tip of the tool. PTL 1 describes a tool holder used in such a through-spindle coolant supply system. The tool holder receives coolant from a coolant supply pipe at the spindle side, so a coolant pipe extending to the spindle side is necessary. The coolant pipe is a part which is discarded along with a tool changing operation. For this and other reasons, usually, as shown in PTL 1, one which is fabricated as a separate member from the tool holder is screwed into the tool holder.

PATENT LITERATURE

PTL 1: Japanese Patent Publication No. 2005-230956

BRIEF SUMMARY OF THE INVENTION

If a worker forgets to connect a coolant pipe to a tool holder and, without realizing that, attaches the tool holder to the spindle and uses it for machining, the inconvenience will arise that the coolant supplied through the spindle will not be supplied to the tool holder but will be refluxed to the spindle side and will enter into the inside of the spindle or a bearing part not inherently meant to act as a coolant channel. If coolant enters the bearing part of the spindle, for example, the lubricating oil of the bearing part will be washed away by the coolant, so serious damage such as seizing of the bearings will sometimes also be invited.

Further, if a coolant pipe is incompletely screwed into a tool holder, the length of the coolant pipe from a reference surface of the tool holder will become longer than the prescribed dimension. This being so, the tool changing operation will not go well and damage will sometimes be caused at the inside of the spindle and a tool changing arm of an automatic tool changer.

At actual machining floors, there are often a mixture of machine tools where through-spindle coolant can be supplied and machine tools where it is not or a mixture of tools requiring through-spindle coolant and tools not requiring it, so a worker must take sufficient care so as not to forget to attach coolant pipes. Reliably confirming the presence of a coolant pipe and whether it is completely screwed in for a large number of tool holders reliably in a short time has been a burden on the worker. In particular, in the case of a tool holder having a hollow taper shank, it is not easy to visually confirm the presence of a coolant pipe arranged inside the hollow taper shank and therefore omissions in check easily occurred.

The present invention is made in consideration of this situation and has as its object the provision of a control method for a machine tool able to reliably confirm in a short time if a coolant pipe has been correctly attached to a tool holder and the provision of such a machine tool.

To achieve the above-mentioned object, according to a first aspect of the present invention, there is provided a control method for a machine tool using a tool holder to which a coolant pipe is attached, the control method for a machine tool comprising a step of detecting any abnormality of attachment of the coolant pipe to the tool holder for a tool triggered by a signal showing that the tool is ready at a tool loading station of the machine tool while the tool holder is at the tool loading station and a step of issuing an alarm if an abnormality is detected at the step of detecting any abnormality.

To achieve the above-mentioned object, according to a second aspect of the present invention, there is provided a machine tool using a tool holder to which a coolant pipe is attached, the machine tool comprising a tool magazine, a tool loading station provided adjoining the tool magazine as a relay part for transferring a tool to be stored in the tool magazine from the outside to the tool magazine and for receiving a tool taken out from the tool magazine to the outside, a coolant pipe detection device for detecting the coolant pipe to be attached to the tool holder when the tool to be stored in the tool magazine is at the tool loading station together with that tool holder, and a controller making the coolant pipe detection device operate triggered by a signal showing that the tool to be stored in the tool magazine is ready at the tool loading station while the tool holder for the tool is at the tool loading station, judging any abnormality in attachment of the coolant pipe based on a signal from the coolant pipe detection device, and issuing an alarm if judging there is an abnormality.

According to the present invention, not only whether the coolant pipe is attached to the tool holder, but also if the coolant pipe is suitably attached can be tested reliably in a short time. The test is performed at the tool loading station before the tool holder is sent to the tool magazine, so it is possible to keep to a minimum the loss of time in the case of an abnormality being detected. Further, this test can be performed in parallel with the machining and tool changing operation, so performing this test will not result in the overall process time becoming longer.

DETAILED DESCRIPTION OF THE INVENTION

Figure 1:
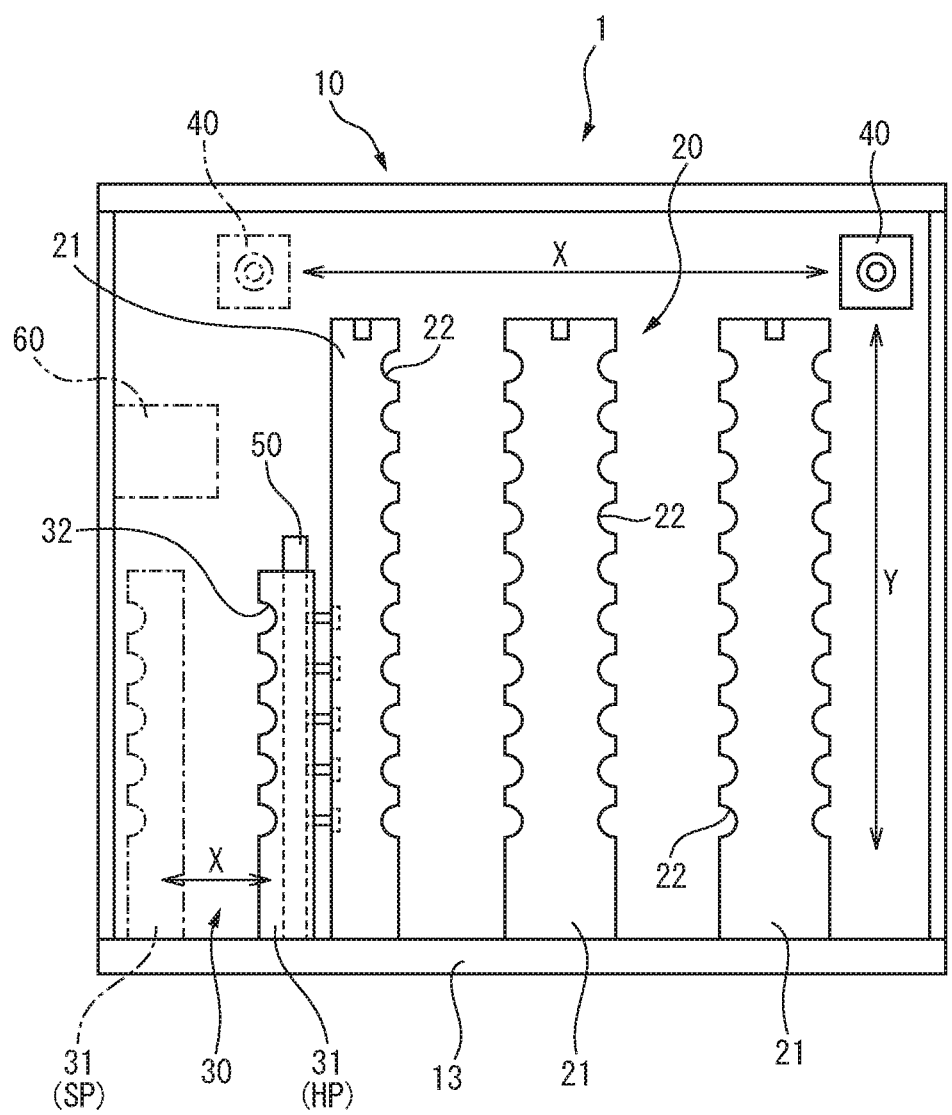
FIG. 1 is a schematic front view of a tool storage housing of a machine tool according to a first embodiment.
Figure 2:
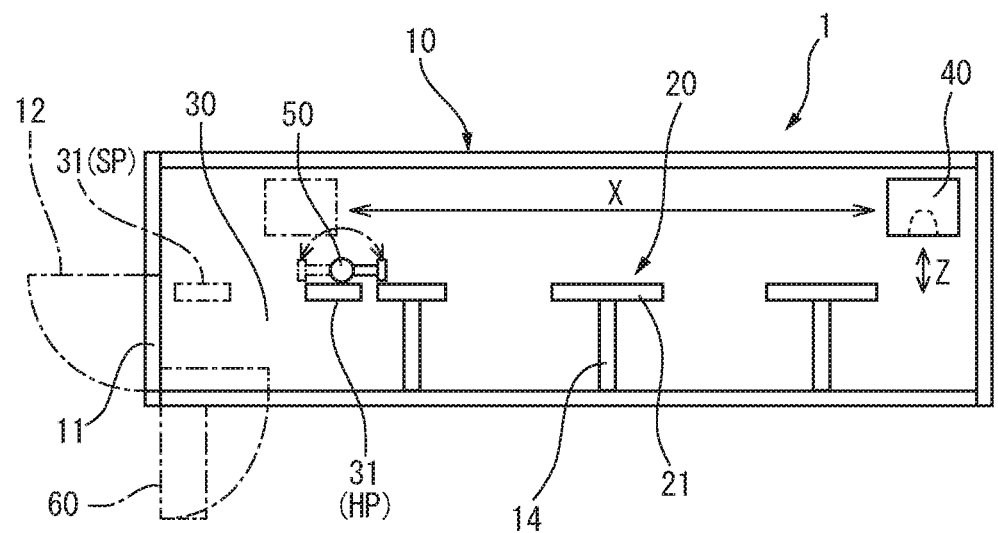
FIG. 2 is a schematic plan view of the tool storage housing of FIG. 1.

Referring to FIG. 1 to FIG. 7, a machine tool 1 of a first embodiment of the present invention will be explained. FIG. 1 is a front view showing a tool storage housing 10 which the machine tool 1 according to the first embodiment of the present invention comprises. Inside of the tool storage housing 10, a tool magazine 20, a tool loading station 30, etc. are arranged. FIG. 1 shows the structure of the inside by being drawn in the state with the front of the housing 10 removed. FIG. 2 is a plan view of the tool storage housing 10 seen from above, but again shows the structure of the inside by being drawn in the state with the top of the housing 10 removed.

The machine tool 1 comprises the tool storage housing 10, the tool magazine 20 arranged inside that housing, the tool loading station 30, a tool carrier 40 carrying a tool inside that housing, and a coolant pipe detection device 50 explained later in detail. The machine tool 1 also comprises a controller. At least part of the functions of the controller are contained in a tool loading station control panel (hereinafter referred to as the "TLS control panel") 60. The TLS control panel 60 is arranged at the outside of the front surface of the tool storage housing 10 at the left side in FIG. 1. The TLS control panel 60 is rotatably provided at the tool storage housing 10 and can open to a maximum of 90 degrees with respect to the front surface of the housing. Further, at the left side surface of the tool storage housing 10 in FIG. 2, a tool loading opening 11 for loading a tool holder to which a tool is attached (not shown in FIGS. 1 and 2) into the tool loading station 30 is provided. The tool loading opening 11 is usually closed by a lockable door 12.

The tool loading station 30 is provided adjoining the tool magazine 20 as a relay part for transferring the tool 70 and tool holder 71 (both not shown in FIGS. 1 and 2) to be stored in the tool magazine 20 from the outside to the tool magazine 20 and for receiving the tool 70 and tool holder 71 taken out from the tool magazine 20 to the outside. For this reason, the tool 70 attached to the tool holder 71 required for machining a workpiece is prepared by a worker at the tool loading station 30.

The prepared tool 70 is stored into the tool magazine 20 by the tool carrier 40. Tools are changed between the tool magazine 20 and spindle (not shown) in accordance with a machining program, then a workpiece is machined. A worn tool or damaged tool is suitably returned to the tool loading station 30 where it is exchanged with a new tool 70 by a worker. If a certain specific workpiece finishes being machined, a worker changes the tools in the tool magazine 20 to tools for next machining a workpiece, through the tool loading station 30.

In this regard, the machine tool 1 according to the first embodiment of the present invention is a horizontal machining center provided with a machining part having a spindle and table and with an automatic tool changer etc. However, in the present embodiment, these machining part and automatic tool changer etc. may be any known types. Illustration and further explanation are omitted.

The tool magazine 20 of the machine tool 1 according to the present embodiment is a matrix type and has a plurality of immovable tool storage notches 22 for holding tool holders 71. A plurality of tool storage notches 22 are, in FIG. 1, regularly arranged in a matrix—10 each at both side surfaces or one side surface of three tool racks 21 fixed to a base 13 of the housing and supported by supports 14 from the side—for a total of 50. The tool storage notches 22 are formed as approximately semicircular notches having openings at their sides. Due to the tool storage notches 22, tool holders 71 with tools 70 attached are held so that their center longitudinal axes At extend in the Z-direction of FIGS. 1 and 2.

Figure 3:
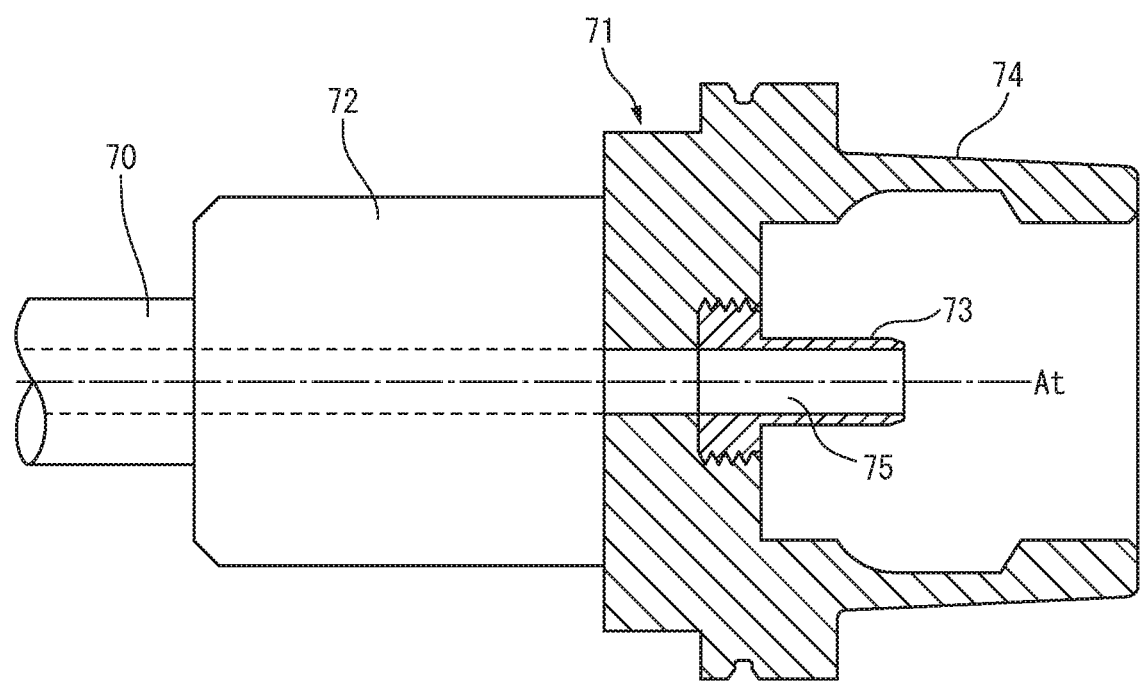
FIG. 3 is a longitudinal partial sectional view of a tool and a tool holder used in the machine tool.

FIG. 3 shows one type of HSK type tool holder 71 etc. constrained at two surfaces used in the machine tool 1 according to the present embodiment. In FIG. 3, a tool 70 gripped by a chuck part 72 of the tool holder 71, a coolant pipe 73 screwed into the tool holder 71 at a center of an inside of a hollow taper shank part 74, and a coolant flow path 75 running through a center longitudinal axis At of the same are also shown. Note that, in FIG. 3, the taper shank part 74 of the tool holder 71 and the coolant pipe 73 are shown in section. In this regard, the tool 70 and the tool holder 71 in this Description have to be handled integrally joined, so in this Description, from here on, the term "tool" shall mean a tool 70 to which a tool holder 71 is joined, while "tool holder" shall mean a tool holder 71 to which a tool 70 is joined.

The tool carrier 40 engages with the taper shank part 74 and holds and conveys the tool holder 71 between the tool magazine 20 and the tool loading station 30. The tool carrier 40 is configured to be able to move in the three X-, Y-, and Z-directions so as to be able to convey tool holder 71 between the tool storage notch 22 of the tool magazine 20 and a TLS tool storage notch 32 of a tool rack of the tool loading station 30 (hereinafter referred to as a "TLS tool rack") 31. The TLS tool storage notches 32 are formed as semicircular notches in the same way as the tool storage notches 22. The tool carrier 40 when arranged at the origin position of the tool carrier 40 is shown by solid lines in FIG. 1. A tool changing arm of an automatic tool changer (not shown) accesses the tool carrier 40 at the origin position so as to change tools.

The TLS tool rack 31 has a plurality (in the present embodiment, five) TLS tool storage notches 32 arranged at equal intervals. The TLS tool rack 31 can move back and forth between a holding position HP close to the tool magazine 20 and a setup position SP close to the tool loading opening 11 in the X-direction. In FIG. 1, the TLS tool rack 31 when arranged at the holding position HP is shown by the solid lines, while the TLS tool rack 31 when arranged at the setup position SP is shown by virtual lines. When the TLS tool rack 31 is at the setup position SP, a worker can attach a tool holder 71 to the TLS tool rack 31 or detach it from there. When the TLS tool rack 31 is at the holding position HP, the tool carrier 40 can detach a tool holder 71 from the TLS tool rack 31 or attach it there.

Figure 4:
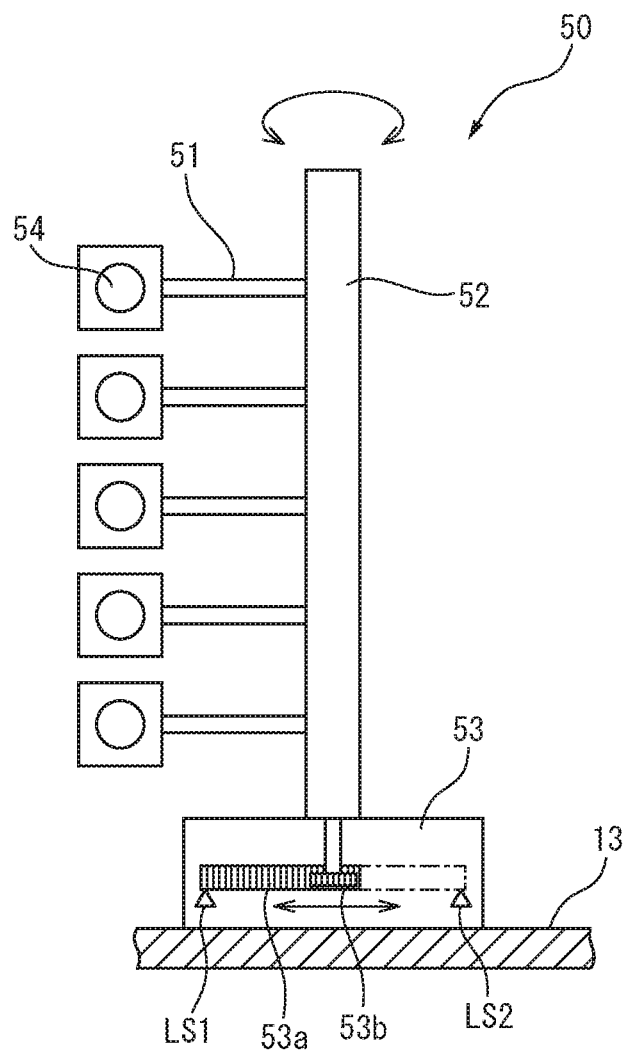
FIG. 4 is a schematic front view of a coolant pipe detection device of the machine tool according to the first embodiment.
Figure 5:
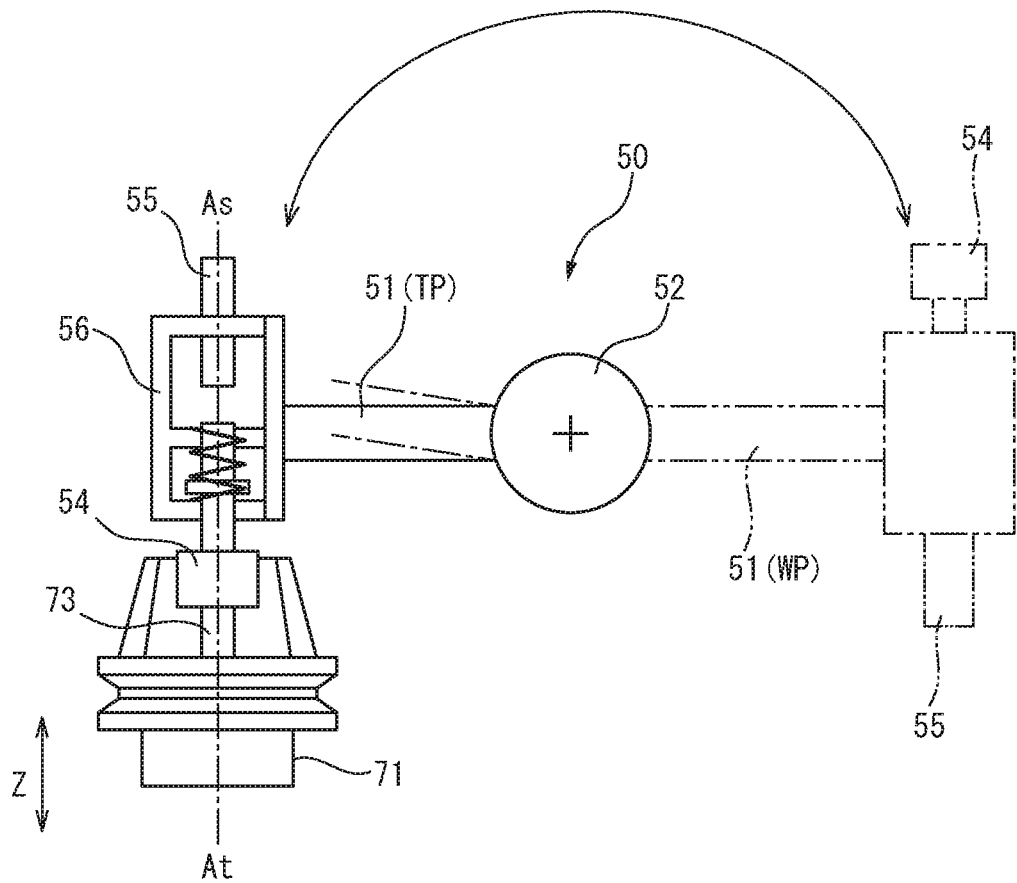
FIG. 5 is a schematic plan view of a coolant pipe detection device detecting a coolant pipe of the tool holder.
Figure 6:
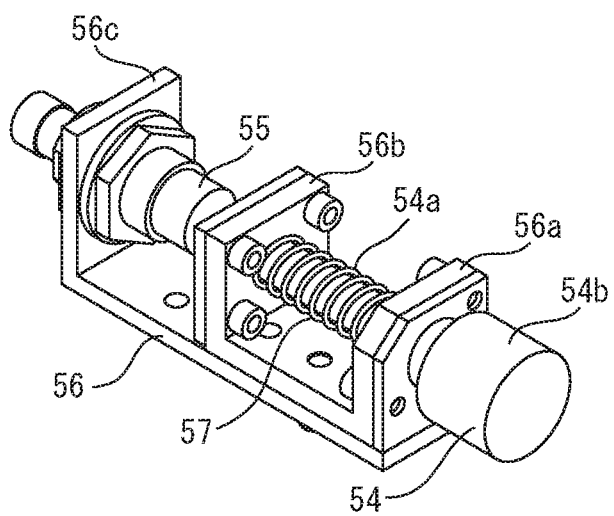
FIG. 6 is a perspective view showing a contactor and proximity sensor of the coolant pipe detection device.

The coolant pipe detection device 50 will be explained in more detail with reference to FIGS. 4, 5, and 6. FIG. 5 is a plan view schematically showing the state where the coolant pipe detection device 50 detects coolant pipes 73 of tool holders 71 attached to the TLS tool storage notches 32 of the TLS tool rack 31. However, in FIG. 5, illustration of the TLS tool rack 31 and TLS tool storage notches 32 is omitted.

Further, the tool holder 71 is drawn with just the taper shank part 74 in a longitudinal sectional view.

The coolant pipe detection device 50 is configured so as to detect if coolant pipes 73 are attached to the tool holders 71 when tool holders 71 are attached to five tool storage notches 32 of the TLS tool rack 31 and when the TLS tool rack 31 is at the holding position HP. For this purpose, the coolant pipe detection device 50 comprises five arms 51 extending horizontally, a vertically extending shaft 52 to which the arms 51 are attached, and a pneumatic actuator 53 driving rotation of the shaft 52. At the front end part of each arm 51, a contactor 54 and proximity sensor 55 for detecting the presence of the coolant pipe 73 are attached through a bracket 56. Further, each arm 51 can engage in arcuate swinging motion, that is, pivot, between a test position TP and a wait position WP.

The contactor 54 and proximity sensor 55 are fastened to the bracket 56 so that their center axes are aligned. A stud part 54a of the contactor 54 is supported by the first support part 56a and second support part 56b of the bracket 56 to be able to move in the direction of the center longitudinal axis As. The contactor 54 also has a columnar button 54b for contacting the end face of the coolant pipe 73 and a return spring 57. The outside diameter of the button 54b is made a size sufficiently covering the outside diameter of the coolant pipe 73 considering also error in the position of the tool holder 71 attached to the TLS tool storage notch 32 of the TLS tool rack 31. The proximity sensor 55 is fastened to a third support part 56c of the bracket 56 so as to be in the OFF state with a predetermined distance from an end part of the stud part 54a of the contactor 54.

The five arms 51 of the coolant pipe detection device 50 are arranged so that when they are at the test position TP, the center longitudinal axes At of the coolant pipes 73 of the tool holders 71 attached to the five TLS tool storage notches 32 of the TLS tool rack 31 at the fixed position HP and the center longitudinal axes As of the contactors 54 are aligned.

In the present embodiment, rotational motion of the shaft 52 is obtained by linear motion of a plunger (not shown) inside the actuator 53 being converted by a rack and pinion. For this reason, inside of the actuator 53, a rack 53a moving linearly back and forth to the left and right by the plunger and the pinion 53b meshing with this are provided. The pinion 53b is fastened to the bottom end part of the shaft 52. The shaft 52 is supported to be unable to move, but to be able to rotate, so if the rack 53a moves, it rotates together with the pinion 53b and as a result the arm 51 rotates about the shaft 52.

The actuator 53 has a first limit switch LS1 and a second limit switch LS2 at the two ends of its operating stroke. Therefore, the operating stroke is determined by the positions of these limit switches. As a result, the range of rotational angle of the arm 51 is determined. In the present embodiment, the first and second limit switches LS1 and LS2 are set so that the range of rotational angle of the arm 51, that is, the range of angle from the wait position WP to the test position TP, is 180 degrees. Further, the first limit switch LS1 will be called an "arm rotation sensor" in this Description from now on.

The coolant pipe detection device 50 is configured so that when the arm 51 is at the test position TP, the contactor 54 contacts the coolant pipe 73 and is pressed in the Z-direction whereupon the proximity sensor 55 is turned ON. Therefore, if the coolant pipe 73 is attached to the tool holder 71, the coolant pipe 73 is detected by the arm 51 arranged at the test position TP. At this time, a signal of the proximity sensor 55 is sent to the controller and the TLS control panel 60 displays the fact that there is no abnormality. Further, when the coolant pipe 73 is not attached to the tool holder 71, even if the arm 51 is at the test position TP, the contactor 54 is not pushed in the Z-direction and the proximity sensor 55 remains OFF, so the fact that there is no coolant pipe 73 is detected. At this time, the TLS control panel 60 displays an alarm along with the identifying number of the TLS tool storage notch 32.

Furthermore, in the present embodiment, due to the coolant pipe detection device 50 and controller, a coolant pipe 73 being incompletely attached can also be detected. "Coolant pipe 73 being incompletely attached" indicates the state where, in this Description, a coolant pipe 73 is incompletely screwed in. In this case, the length of the coolant pipe 73 from the reference surface of the tool holder 71 becomes longer than the prescribed length, so the proximity sensor 55 is turned ON before the arm 51 reaches the test position TP from the wait position WP, that is, before the arm rotation sensor LS1 operates. Therefore, if receiving an ON signal of the proximity sensor 55 from the coolant pipe detection device 50 before the arm rotation sensor LS1 operates, the controller judges that the coolant pipe 73 is incompletely attached and displays an alarm together with an identifying number of the TLS tool storage notch 32 on the TLS control panel 60.

The coolant pipe detection device 50 at the present embodiment is arranged inside of the tool storage housing 10 so that when at the wait position WP, the arms 51 are retracted from the travel path of the tool carrier 40 so as to avoid interference between the arms 51 and the tool carrier 40. As shown in FIG. 2, the tool carrier 40 moves in the X-direction at the back surface side of the tool storage housing 10 compared with the coolant pipe detection device 50. When the tool carrier 40 moves in the Z-direction to approach the TLS tool rack 31, the arms 51 are arranged at the wait position WP. The arms 51 arranged at the wait position WP will not interfere with the tool carrier 40 approaching the TLS tool rack 31.

Figure 7:
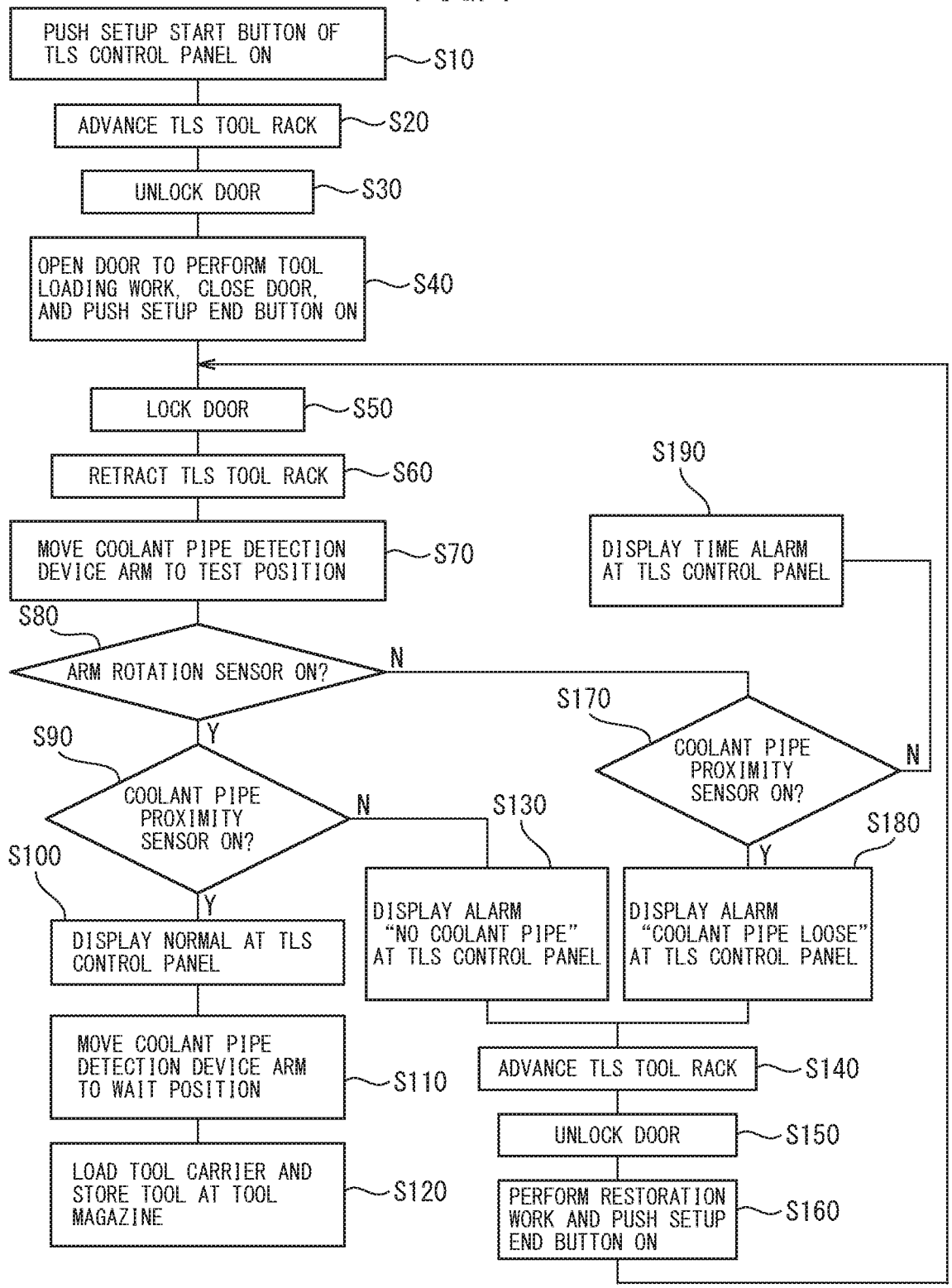
FIG. 7 is a flow chart showing how presence of an abnormality in attachment of the coolant pipe is detected.

Next, how the controller and coolant pipe detection device 50 of the machine tool 1 according to the first embodiment of the present invention are used to detect an abnormality in attachment of the coolant pipe 73 will be explained in accordance with the flow chart illustrated in FIG. 7.

First, at step S10, a setup start button provided at the TLS control panel 60 is pushed ON by a worker. This being so, at step S20, the TLS tool rack 31 moves from the holding position HP to the setup position SP.

At step 30, the door 12 of the tool loading opening 11 of the tool storage housing 10 is unlocked.

At step S40, the door 12 is opened by a worker, tool holders 71 are attached to TLS tool storage notches 32 of the TLS tool rack 31, the door 12 is closed, then a setup end button provided on the TLS control panel 60 is pushed ON.

At step S50, the door 12 is locked. This being so, at step S60, the TLS tool rack 31 retracts to the holding position HP.

This being so, immediately, at step S70, the arms 51 of the coolant pipe detection device 50 move from the wait position WP to the test position TP.

At step S80, it is judged if the arm rotation sensor LS1 is turned ON.

If the arm rotation sensor LS1 is turned ON, the routine proceeds to step S90 where it is judged if the proximity sensors 55 are turned ON.

If the proximity sensors 55 are turned ON, the routine proceeds to step S100 where the TLS control panel 60 displays the fact that the coolant pipes 73 have been normally attached.

At step S110, the arms 51 of the coolant pipe detection device 50 move to the wait position WP.

At step S120, the tool carrier 40 carries the tool holders 71 from the TLS tool rack 31 to predetermined tool storage notches 22 of the tool rack 21 of the tool magazine 20.

If at step S90 the proximity sensor 55 is not turned ON, the routine proceeds to step S130 where the TLS control panel 60 displays the alarm "there is no coolant pipe at the tool of the No. xx TLS tool storage notch".

At step 140, the TLS tool rack 31 moves from the holding position HP to the setup position SP while the tested tool holders 71 are kept at the TLS tool rack 31.

At step S150, the door 12 is unlocked.

At step S160, a coolant pipe 73 is attached to the tool holder 71 by a worker and if that tool holder 71 is returned to the TLS tool rack 31, the setup end button is pressed, the routine returns to step S50, and the door 12 is locked.

If, at step S80, the arm rotation sensor LS1 is not turned ON, the routine proceeds to step S170 where it is judged if the proximity sensors 55 are turned ON. If the proximity sensors 55 are turned ON, the routine proceeds to step S180 where the TLS control panel 60 displays an alarm that "the coolant pipe of the tool at the No. xx TLS tool storage notch is loose". Next, in the same way as the above-mentioned case, the routine proceeds to step S140 on.

If at step S170 the proximity sensor 55 is not turned ON, the routine proceeds to step S190 where a time alarm is displayed at the TLS control panel 60. In this case, a defect in the rotational mechanism of the coolant pipe detection device 50 may be suspected.

According to the machine tool 1 according to the first embodiment of the present invention, the coolant pipe detection device 50 and controller can reliably check for not only the presence of cooling pipes 73, but also whether coolant pipes 73 have been suitably attached for a plurality of tool holders 71 all at once in a short time. The test is performed at the tool loading station 30 before the tool holders 71 are sent to the tool magazine 20, so it is possible to keep to a minimum the loss of time when an abnormality is detected. In particular, right after a worker inserts new tools 70 in the tool loading station 30, that is, triggered by a signal showing that tools 70 have been prepared at the tool loading station 30, it is possible to determine if there is any abnormality in attachment of coolant pipes 73 by viewing the display of the TLS control panel 60. In the case of an abnormality, a worker can immediately perform work for supplementing or screwing in the coolant pipes 73. Further, this test can be performed in parallel with the machining and tool changing operation, so the overall machining time will not become longer due to performing this test. Tools stored in the tool magazine 20 are all loaded from the tool loading station. The presence of any abnormality in attachment of coolant pipes 73 is detected triggered by a signal showing that tools 70 are prepared at the tool loading station 30, so as a result, only tools 70 to which coolant pipes 73 are normally attached are stored in the tool magazine 20.

Further, the arms 51 of the coolant pipe detection device 50 move between the wait position WP and test position TP not by linear movement, but by rotation. For this reason, the coolant pipe detection device 50 can be realized by a relatively simple structure.

Figure 8:
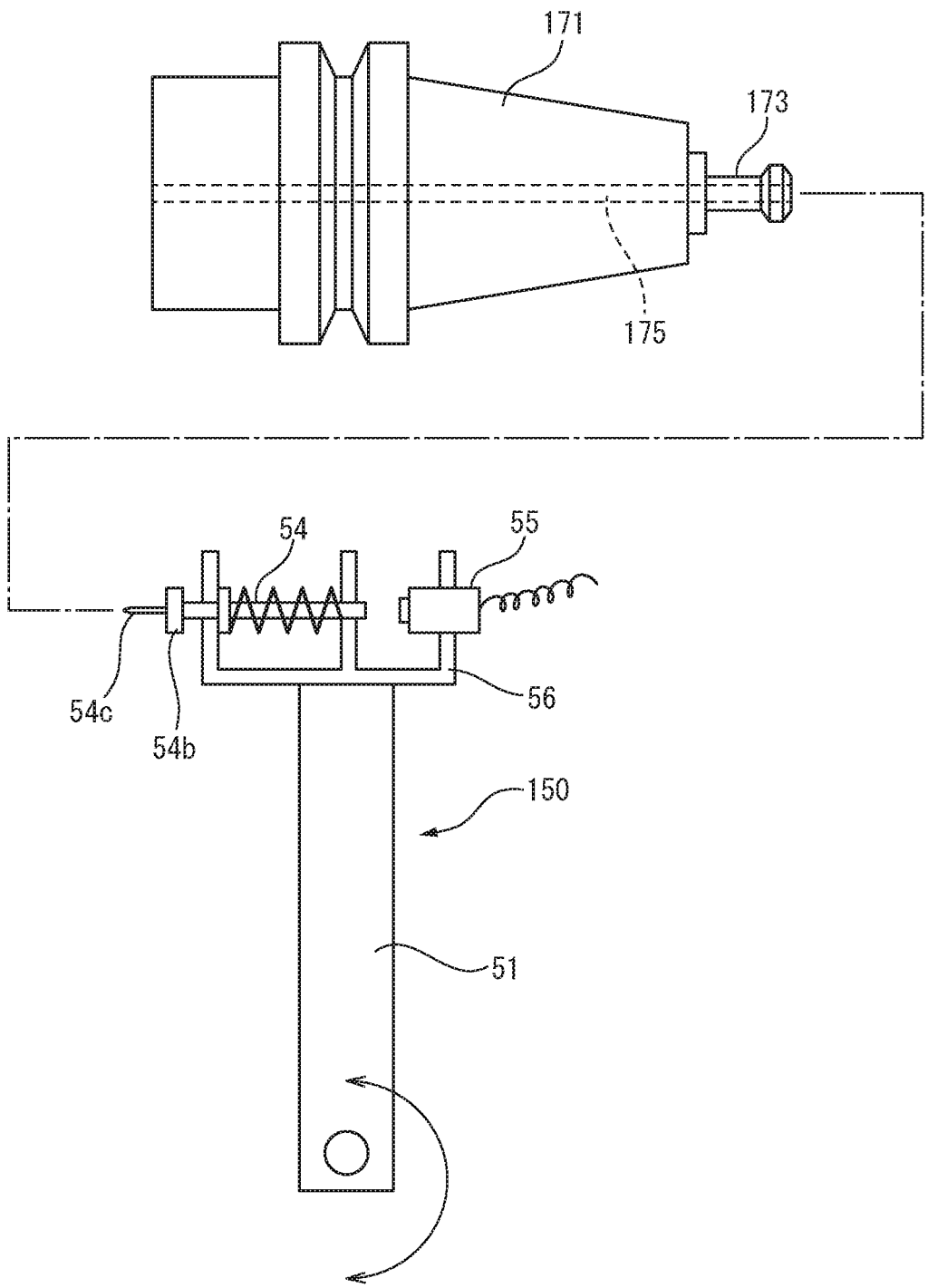
FIG. 8 is a schematic plan view of a coolant pipe detection device of a modification of the machine tool according to the first embodiment.

A modification of the machine tool according to the first embodiment of the present invention will be explained with reference to FIG. 8. In the machine tool of this modification, a coolant pipe detection device 150 detects coolant pipes 173 attached to BT shank type tool holders 171. A "coolant pipe 173" referred to here is a pull stud with a coolant flow path 175 for a BT shank type tool holder 171. The coolant pipe detection device 150 has rotating type arms 51 and contactors 54, proximity sensors 55, and brackets 56 attached to the same in the same way as the case of the first embodiment. In this modification, further, probes 54c are fixed to the centers of the buttons 54b of the contactors 54. The outside diameters of the probes 54c are sufficiently smaller than the inside diameters of the coolant flow paths 175 of the coolant pipes 173, so when the arms 51 are arranged at the test position TP, the probes are inserted into the coolant flow paths 175 of the coolant pipes 173 and therefore the buttons 54b of the contactors 54 are not blocked from contacting the end faces of the coolant pipes 173. Therefore, usually, in the same way as the case of the first embodiment, it is possible to detect the presence of the coolant pipes 173.

In this modification, a dummy coolant pipe (not shown) not having a coolant flow path is attached to a tool holder 171 not requiring supply of through-spindle coolant. If a dummy coolant pipe, that is, pull stud, is attached to a tool holder 71, the probe 54c contacts the end face of the dummy coolant pipe and the proximity sensor 55 is turned on considerably before the arm 51 reaches the test position TP. Due to that, the controller judges that a dummy coolant pipe is attached to the tool holder 171 and can perform control which permits conveyance of that tool holder 171 to the tool magazine 20 without keeping it at the TLS tool rack 31 and stops the supply of coolant to the spindle when that tool holder 171 is attached to the spindle and used for machining.

Figure 9:
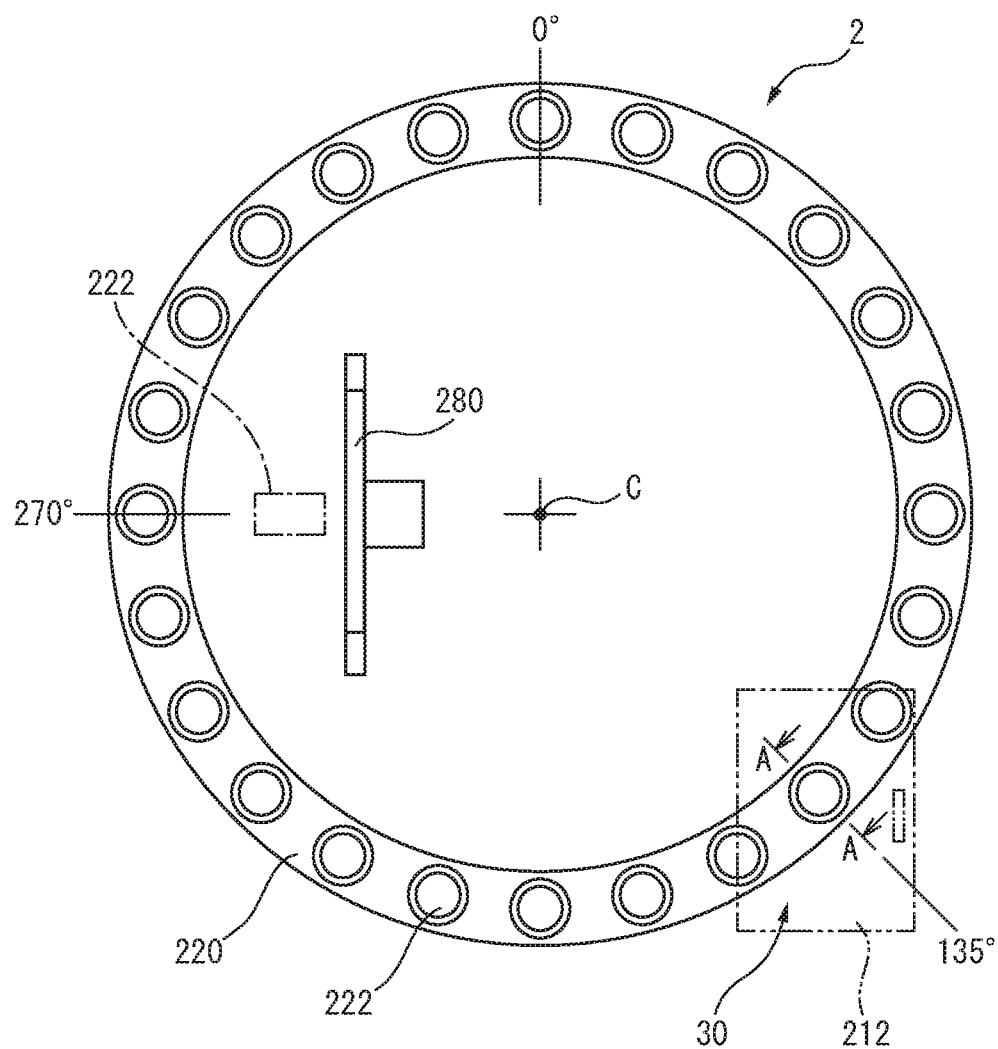
FIG. 9 is a front view schematically showing a tool magazine of a machine tool according to a second embodiment.

A machine tool 2 according to a second embodiment of the present invention will be explained below referring to FIG. 9. This machine tool 2 differs from the machine tool 1 according to the first embodiment in the point that the tool magazine is a ring-type tool magazine 220 able to rotate about a center point C. FIG. 9 is a schematic view showing the tool magazine 220 of a machine tool according to the second embodiment and a tool changing arm 280 of an automatic tool changer. The tool magazine 220 of FIG. 9 has 24 tool pots 222. In this tool magazine 220, the tool changing position with the spindle by the tool changing arm 280 is set to the position of 270 degrees shown in FIG. 9. The tool attachment position according to the worker is set at the position of 135 degrees. The tool magazine 220 is usually housed inside a tool storage housing (not shown), so is provided with a tool loading opening in front of the tool attachment position and the door 212 opening and closing the same and shown by virtual lines in the figure. The worker inserts a spatula, specially designed for taking out a tool holder 171 from a tool pot 222, into the clearance between a flange part of the tool holder 171 and the front end face of the tool pot 222 to pull out a tool 70 or push a tool 70 into the tool pot to attach it. In the second embodiment, this tool attachment position corresponds to the tool loading station.

Figure 10:
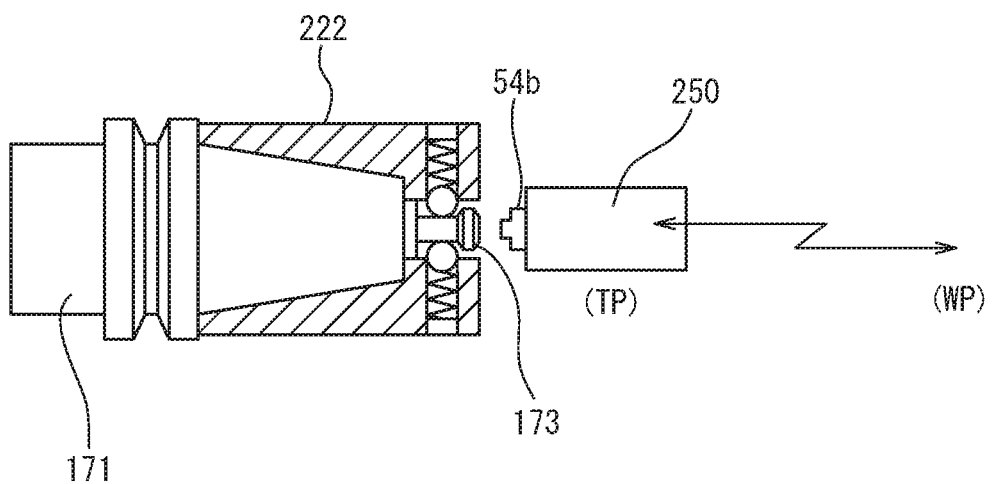
FIG. 10 is a cross-sectional view along a line A-A of FIG. 9 and a view schematically showing a coolant pipe detection device of the machine tool according to the second embodiment.

As shown in the sectional view along the line A-A of FIG. 9 shown in FIG. 10, at the back surface side of the tool magazine 220 of the tool attachment position, a coolant pipe detection device 250 is arranged. The coolant pipe detection device 250 in the second embodiment, as shown in FIG. 10, detects the presence of a coolant pipe 173 of the BT shank type tool holder 171. The coolant pipe detection device 250 comprises an actuator (not shown) which linearly moves back and forth in the direction of the center longitudinal axis of the tool holder 171 attached to the tool pot 222 between a wait position WP and a test position TP. This coolant pipe detection device 250 has a built in contactor 54 and proximity sensor 55 explained in FIG. 8. At the front end, a button 54b with a probe 54c is provided. The presence of a coolant pipe 173 is detected when it is arranged at the test position TP by the actuator.

Even when the coolant pipe detection device 50 detects that a coolant pipe 73 is not attached to a certain specific tool holder 71, since priority is given to machining of the workpiece, control may be performed to send that tool holder 71 to the tool magazine 20 without keeping it at the TLS tool rack 31. In this case, when the tool holder 71 in question is attached to the spindle for use for machining, control is performed to stop the supply of the through-spindle coolant.

An embodiment in which the coolant pipe detection device 50 comprises an angle sensor for detecting a rotational angle of an arm 51 from the wait position WP is also possible. In this case, when the proximity sensor 55 is turned on, an abnormality of the length of the coolant pipe 73 is detected based on the rotational angle of the arm 51 detected by the angle sensor.

At the first embodiment, whether or not there is a problem with the length of an attached coolant pipe 73 is judged by the controller based on the signal from the coolant pipe detection device 50, but an embodiment where a coolant pipe detection device 50 is provided as a judgment circuit able to make such a judgment is also possible.

The coolant pipe detection device of the present invention detects an abnormality of attachment of a coolant pipe, but the "abnormality of attachment" includes not only the cases where a coolant pipe is not attached and a coolant pipe is not completely screwed in, but also the case where a long coolant pipe for another type of machine tool is mistakenly attached. Further, if a short coolant pipe is attached, it is just judged that no coolant pipe has been attached and an alarm is issued as usual, so there is no problem.

REFERENCE SIGNS LIST 10. tool storage housing
20. tool magazine
30. tool loading station
31. TLS tool rack
32. TLS tool storage notch
40. tool carrier
50. coolant pipe detection device
51. arm
52. shaft
53. actuator
54. contactor
55. proximity sensor
60. TLS control panel

The invention claimed is:

1. A machine tool using a tool holder to which a coolant pipe is attached, the machine tool comprising:
    a tool magazine,
    a tool loading station provided adjoining the tool magazine and configured as a relay part for receiving from outside the machine tool a tool to be transferred to and stored in the tool magazine and for receiving a tool taken out from the tool magazine to be removed to the outside of the machine tool,
    a coolant pipe detection device for detecting the coolant pipe to be attached to the tool holder when the tool to be stored in the tool magazine is at the tool loading station together with that tool holder, and
    a controller making the coolant pipe detection device operate triggered by a signal showing that the tool to be stored in the tool magazine is ready at the tool loading station while the tool holder for the tool is at the tool loading station, judging any abnormality in attachment of the coolant pipe based on a signal from the coolant pipe detection device, and issuing an alarm when judging there is an abnormality.

2. The machine tool of claim 1, wherein the controller is configured so as to detect a problem in the length of the coolant pipe attached to the tool holder based on the signal from the coolant pipe detection device.

3. The machine tool of claim 1, wherein the controller is configured so as to keep the tool holder at the tool loading station without transferring the tool holder to the tool magazine when the tool holder with no coolant pipe attached is detected.

4. The machine tool of claim 1, wherein
    the machine tool further comprises a tool carrier for carrying the tool holder between the tool loading station and the tool magazine,
    the coolant pipe detection device comprises an arm reciprocating between a test position and a wait position by arcuate swing motion,
    the arm has a contactor and a proximity sensor for detecting presence of the coolant pipe,
    when the arm is at the test position, the contactor contacts the coolant pipe of the tool holder ready at the tool loading station, and
    when the arm is at the wait position, the arm is retracted from the path of travel of the tool carrier so as to avoid interference with the tool carrier.

5. The machine tool of claim 4, wherein before the arm of the coolant pipe detection device reaches the test position, the controller judges that there is a problem of length of the coolant pipe when the coolant pipe detection device detects attachment of the coolant pipe to the tool holder.

* * * * *